April 29, 1969  M. S. MORGAN ET AL  3,441,574
PROCESS FOR MAKING ANTHRAQUINONE
Filed Jan. 12, 1966
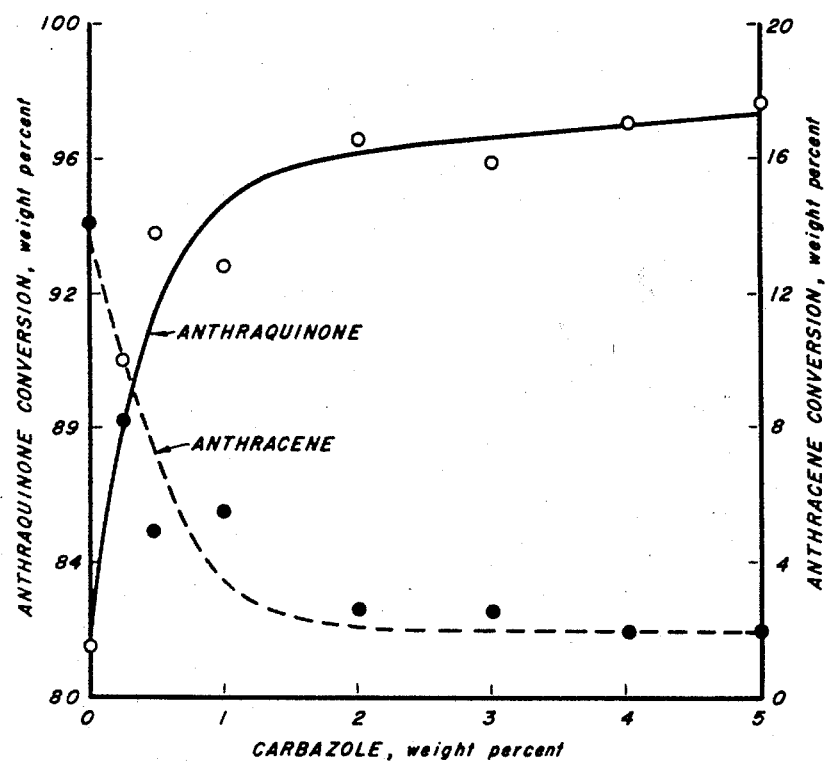
INVENTORS
MARCUS S. MORGAN and
ALBERT W. SIMON
By Donald G. Dalton
Attorney

United States Patent Office 3,441,574
Patented Apr. 29, 1969

3,441,574
PROCESS FOR MAKING ANTHRAQUINONE
Marcus S. Morgan, Mount Lebanon Township, Allegheny County, and Albert W. Simon, White Oak Borough, Pa., assignors to United States Steel Corporation, a corporation of Delaware
Filed Jan. 12, 1966, Ser. No. 520,147
Int. Cl. C09b 1/00; C07c 45/00
U.S. Cl. 260—369                    11 Claims The present invention relates to an improved process for oxidizing 9,10-dihydroanthracene to anthraquinone.

Vapor-phase oxidation of anthracene is a known method for preparing anthraquinone. This process, however, requires a source of high-purity anthracene, since carbazole, one of the coal-tar constituents that occurs with anthracene has a detrimental effect in the vapor-phase oxidation of anthracene. It lowers the yield of anthraquinone and forms by-products which contaminate the final product.

Patent No. 3,163,657 discloses a process for oxidizing 9,10-dihydroanthracene to anthraquinone with oxygen using benzyltrimethylammonium hydroxide as the catalyst and pyridine as a preferred solvent. Although this process gives good yields, the catalyst and solvent are relatively expensive. In addition, the catalyst is relatively unstable thermally and begins to decompose at 70° to 80° C., placing a limitation on the reaction temperature that may be used. While the process may be used to oxidize a 9,10-dihydroanthracene product obtained by hydrogenation of crude anthracene, said product must first be separated from the hydrogenation product by fractionation.

We have now found that 9,10-dihydroanthracene, even when in a product obtained by hydrogenating crude anthracene, may be readily oxidized to anthraquinone by oxygen in the presence of a suitable basic catalyst and a proper solvent.

The strength of a base in a particular solvent is important because it appears to influence the nature of the resulting oxidation product. For example, when 9,10-dihydroanthracene is oxidized in dimethyl sulfoxide in the presence of potassium t-butoxide, a very strong base, anthracene, rather than anthraquinone is formed as the major oxidation product. We have found that with a somewhat weaker base in a suitable solvent, anthraquinone is the major oxidation product. Among useful bases are the hydroxides and methoxides of sodium and potassium.

The oxidation in the presence of appropriate basic catalysts will only take place in certain selected solvents. No reaction takes place when pyridine is the solvent. Included among the solvents that have been found to be effective are dimethylformamide, dimethylacetamide, dimethyl sulfoxide, and acetonitrile. These compounds are dipolar aprotic solvents, a classification which indicates that they are characterized by having large dipole moments and high dielectric constants, and in addition, do not contain hydrogen atoms capable of forming hydrogen bonds.

The dipolar aprotic solvents are also characterized by the property that they have very little tendency to solvate small anions such as the hydroxide anion. As a result, the unsolvated hydroxide ion has sufficient base strength to remove a proton from a relatively weak carbon acid such as 9,10-dihydroanthracene and form the 9,10-dihydroanthracene carbanion.

When 9,10-dihydroanthracene is dissolved in a dipolar aprotic solvent such as dimethylacetamide, and a catalytic amount of base such as sodium hydroxide is added, an orange-red color is developed, indicative of carbanion formation. When an oxygen-containing gas is passed through this mixture, a rapid exothermic reaction takes place, and after a short period, anthraquinone begins to precipitate out of solution. When the reaction is complete, the anthraquinone may be recovered in a high state of purity by filtration. The reactions involved may be represented schematically as:

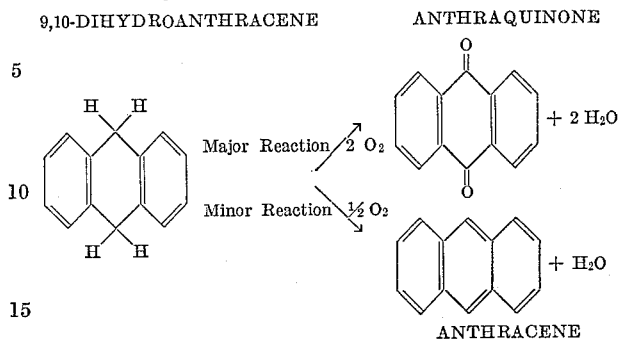

It has also been found that carbazole acts as a co-catalyst in this oxidation by accelerating the rate of oxidation of 9,10-dihydroanthracene to anthraquinone. Thus, the presence of carbazole, which is found to be undesirable in the vapor-phase oxidation of anthracene, is found to be advantageous in the oxidation of 9,10-dihydroanthracene.

It was found that a powdered catalyst, for example, powdered solid sodium hydroxide (98 percent purity) may be used in the reaction. It is more convenient, however, to use 50 percent by weight of aqueous sodium hydroxide. Twenty-five percent aqueous sodium hydroxide was somewhat less effective with dimethylformamide than was the 50 percent solution. The base composition may contain as solvent between about 0 and 75 percent water or methanol and preferably should be within the limits of about 25 to 50 percent water or methanol. Similar limits are applicable to such other bases as potassium hydroxide and sodium or potassium methoxide.

The molecular ratio of catalyst to 9,10-dihydroanthracene may vary between about 0.1 and 1.0. With pure 9,10-dihydroanthracene and dimethylformamide as the solvent, the optimum ratio was found to be about 0.5. With dimethylacetamide, the optimum ratio was found to be about 0.25. Crude materials containing tar acids, in general, will require more than the optimum determined for pure materials, the excess being required to neutralize the feed stock. The amount of base used should be kept to a minimum to reduce to a minimum, hydrolysis of the solvent at higher reaction temperatures. The hydrolysis products also react with and coat the base particles, making them ineffective and requiring more of the base. Hence, by initiating the reaction at a preferred low temperature and controlling the temperature range, the molecular ratio may be reduced to the low side of the range. Potassium hydroxide and sodium or potassium methoxide were found effective in the same molecular ratio range.

Dimethylacetamide is the preferred solvent, since it is more stable toward oxidation and more resistant to hydrolysis under the strongly basic conditions required for the reaction. With dimethylacetamide, the amount of hydrolysis in a typical reaction may be less than about 0.2 percent. Under similar conditions, the amount of dimethylformamide hydrolyzed may fall in a range between about 1.5 to 3.0 percent.

The preferred concentration may be in the range of about 5 to 9 parts by weight of solvent to each part by weight of 9,10-dihydroanthracene. Sufficient solvent should be used to avoid co-precipitation of any anthracene with the anthraquinone. As described hereinafter, a ratio of up to 21:1 was used in some specific examples to aid in controlling the temperature during the exothermic reaction.

It has been found that the reaction will take place at temperatures from about 30° C. to 150° C. At temperatures over 80° C. however, the rate of hydrolysis of the solvent becomes rapid enough to consume appreciable quantities of the base. It has also been found that anthracene formation is greater at higher reaction temperatures and consequently, purer anthraquinone may be obtained by working at lower temperatures. In general, the preferred reaction temperature ranges is between about 40° and 80° C. It has been found that the addition of either carbazole or indole as a cocatalyst makes it practical to carry out the oxidation under milder temperature conditions.

With pure 9,10-dihydroanthracene, the amount of oxygen consumed is that which is expected from theory: two moles of oxygen for every mole of anthraquinone formed. However, crude materials may contain components in addition to the 9,10-dihydroanthracene which may react with the oxygen and would therefore consume more than the calculated amount of oxygen based on the 9,10-dihydroanthracene content. Oxygen is preferred, although air and carbon dioxide-free air may be used.

The reaction times are governed by the selection of the above-described variables, but in general, range from 10 to 150 minutes. It is preferred to maintain the reaction time as short as possible to reduce the possibility of solvent hydrolysis by the base.

dihydroanthracene. The orange-red color developed immediately and the oxygen uptake began without an induction period. A plot was made of the drop in oxygen pressure versus time. The temperature rise (to 60° C.) due to the exothermic reaction was also recorded. After 150 minutes, when there was no longer any change in oxygen pressure, the shaking was stopped and the reaction bottle cooled to room temperature to obtain the final oxygen pressure reading of 52 p.s.i.g. used to calculate the total amount of oxygen consumed. An amount of acid, such as acetic or hydrochloric acid, calculated to be equivalent to the amount of base present at the start of the reaction was added to neutralize any free base. The mixture was then filtered to separate the anthraquinone, which was washed with a small amount of fresh solvent and then with water. The precipitate was dried and weighed 8.35 grams. It was found to contain 97.6 percent anthraquinone, for a 78.4 percent conversion. The filtrate was vacuum distilled to recover the solvent. The residue therefrom contained a small amount of anthraquinone which increased the total conversion to 80.7 percent.

Example 1 was repeated as Examples 2–6, using 9.0 grams pure 9,10-dihydroanthracene and changing only the solvent or catalyst as indicated in Table 1 wherein the conditions and results are summarized.

TABLE 1

| Example No. | 1 | 2 | 3 | 4 | 5 | 6 |
|---|---|---|---|---|---|---|
| Solvent | Dimethylformamide. | Dimethylacetamide. | Dimethylacetamide. | Dimethylsulfoxide. | Acetonitrile. | Dimethylformamide. |
| Solvent, ml. | 60 | 70 | 70 | 70 | 70 | 50. |
| Catalyst | Sodium hydroxide. | Sodium hydroxide. | Sodium methoxide. | Sodium hydroxide. | Sodium hydroxide. | Potassium hydroxide. |
| Catalyst composition | 1.31 ml., 50% aqueous. | 0.5 grams, powder. | 2.7 grams, 25% methanolic. | 0.65 ml., 50% aqueous. | 0.65 ml., 50% aqueous. | 3.7 ml., 50% aqueous. |
| Molecular ratio catalyst to 9,10-dihydroanthracene. | 0.5 | 0.25 | 0.25 | 0.25 | 0.25 | 1.0. |
| Initial temperature, °C | 55 | 50 | 50 | 50 | 50 | 50. |
| Maximum temperature, °C | 60 | 78 | 110 | 116 | 90 | 90. |
| Reaction time, min | 150 | 60 | 60 | 60 | 60 | 90. |
| Total anthraquinone conversion, weight percent. | 80.7 | 73.2 | 47.7 | 71.6 | 38.9 | 53.4. |

The catalytic effect of carbazole, for example, is quite important where mixtures such as hydrogenation products are oxidized that contain a low content of 9,10-dihydroanthracene. It has been found preferable, however, to fractionate a crude product of a known hydrogenation step. The fractionation product may comprise about 50% to 75% 9,10-dihydroanthracene. It contains no carbazole, however, which is found in the distillation residue. The carbazole may be recovered from the residue as a purified product, for example, by xylene crystallization.

The following are typical examples of the process showing how anthraquinone is made.

EXAMPLES 1–6

The reaction was performed with oxygen in a Parr pressure apparatus so that the rate of oxygen uptake could be used as a guide in studying the variables of the reaction and its completion. A shaker-type pressure apparatus was used. To a reaction bottle was added 56.5 grams (60 ml.) of dimethylformamide and 9.0 grams (50 millimoles) of pure 9,10-dihydroanthracene (weight ratio 6.3:1). A vial containing 1.31 ml. of 50 percent aqueous sodium hydroxide (25 millimoles) was placed upright in the bottle so that the contents would not mix prematurely with the solvent containing the 9,10-dihydroanthracene. The molecular ratio of catalyst to 9,10-dihydroanthracene was 0.5. The apparatus was assembled, evacuated and purged three times with oxygen. Then the initial oxygen pressure was adjusted to 59 p.s.i.g. at room temperature. By means of an electrical-resistance heater the reaction bottle was heated to 55° C. When the temperature had stabilized, the heat input was discontinued and the shaking mechanism was started to mix the basic catalyst with the solvent mixture containing the 9,10-

EXAMPLE 7

According to the Example 1 procedure, to 56.3 grams of a synthetic mixture containing 16 percent 9,10-dihydroanthracene (50 millimoles), 81 percent phenanthrene, and 3 percent carbazole was added 70 ml. of dimethylacetamide. The base catalyst was 0.65 ml. of 50 percent aqueous sodium hydroxide. After starting the reaction at 65° C., the temperature rose 123° C., and oxygen uptake was complete in 20 minutes. The anthraquinone filter cake weighed 9.32 grams and contained 98.8 percent anthraquinone, for a direct recovery conversion of 88.6 percent. The residue increased the total conversion to 96.6 percent.

EXAMPLE 8

Example 7 was repeated, except that the carbazole in the synthetic mixture was eliminated. To 70 ml. of dimethylacetamide was added 56.3 grams of a synthetic mixture containing 16 percent 9,10-dihydroanthracene (50 millimoles) and 84 percent phenanthrene. The base was 0.65 ml. of 50 percent sodium hydroxide. The reaction was started at 65° C. It rose to 67° C. and then dropped off because of the slow rate of reaction as indicated by the slow oxygen absorption. The reaction was stopped after 85 minutes, and the mixture was estimated to contain only 23 percent anthraquinone based on the oxygen uptake.

EXAMPLES 9 AND 10

A sample of a crude anthracene fraction obtained from coal tar creosote oil was selectively hydrogenated by a known method in a stirred autoclave. According to the method, to 100 parts of crude anthracene fraction there was added 10 parts of a molybdenum sulfide catalyst. The mixture was agitated while heating for 6 hours at 200° C. under a hydrogen pressure of 500 p.s.i.g. The mixture was then filtered while hot to remove the catalyst. The sample was found to contain 9.6 percent 9,10-dihydroanthracene and no unreacted anthracene. Vacuum distillation through a packed column gave a fraction which when analyzed by gas chromatography was found to contain 73.9 percent 9,10-dihydroanthracene, 5.7 percent fluorene, and 20.4 percent of unidentified material. No carbazole was found.

A 12.2 gram sample of the fraction containing 73.9 percent 9,10-dihydroanthracene (50 millimoles) was dissolved in 70 ml. of dimethylacetamide. After pressuring with oxygen to 60 p.s.i.g., and heating to 50° C., 0.98 ml. of 50 percent sodium hydroxide (19 millimoles) was added to the solution. An exothermic reaction began immediately and an attempt was made to cool the reactor with an air blast, but the temperature increased to a maximum of 58° C. before it could be controlled again at 50° C. After 90 minutes, the reaction was stopped. The anthraquinone filter cake weighed 8.76 grams, and contained 99.0 percent anthraquinone. The anthraquinone conversion was 83.3 percent.

When the Example 9 oxidation was repeated as Example 10, adding only 0.2 gram carbazole (2% by weight of 9,10-dihydroanthracene) the conversion to anthraquinone was 88.0%. Furthermore, the reaction time was reduced to 35 minutes.

EXAMPLE 11

According to the hydrogenation procedure of Example 9, there was hydrogenated a sample of crude anthracene cake that had been obtained by the fractionation of creosote. The hydrogenation product contained 14.1 percent 9,10-dihydroanthracene, no anthracene, 50.9 percent phenanthrene, 5.9 percent carbazole, and 29.1 percent of other components. In accordance with the procedure of Example 1, a 64.0 gram portion (containing 50 millimoles of 9,10-dihydroanthracene) of the hydrogenation product was added to 60 ml. of dimethylacetamide. The catalyst was 2.63 milliliters of 50 percent sodium hydroxide (50 millimoles). The molecular ratio of catalyst to 9,10-dihydroanthracene was 1.0. The reaction was started at 30° C. The temperature rose to 41° C. and then leveled off. The mixture was then heated to 65° C. The reaction temperature attained 118° C. The total reaction time was 35 minutes. The anthraquinone filter cake weighed 8.69 grams and contained 94.4 percent anthraquinone, for a conversion of 78.8 percent. The anthraquinone contained in the filtrate residue increased the total anthraquinone conversion to 86.4 percent.

The above examples illustrate the basic reaction of oxidizing 9,10-dihydroanthracene to anthraquinone in a dipolar aprotic solvent, with a basic catalyst that forms a carbanion with 9,10-dihydroanthracene. The beneficial effect of carbazole as cocatalyst is also illustrated. In the designated categories various solvents and catalysts were found to be operative in oxidizing to anthraquinone pure 9,10-dihydroanthracene and mixtures thereof with other materials. It was found that the oxidation reaction varied, for example, in the temperature rise and reaction time.

In the following examples the reaction temperature was controlled at 50° C.($\neq$3° C.) by the use of heat, refrigeration and a relatively large quantity of solvent. The preferred reactants remained the same except that in Example 12 no carbazole was added. In the further examples varying quantities of carbazole were added. Indole was also found to be effective as a cocatalyst in the same concentration wherein carbazole was found to be effective.

EXAMPLES 12–25

In Example 12, in an electrically-heated, Parr pressure apparatus, 4.5 g. (25 millimoles) of pure 9,10-dihydroanthracene was dissolved in 94.3 g. (100 ml.) of dimethylacetamide (weight ratio 1:21). After purging, the initial oxygen pressure was adjusted to 59 p.s.i.g. at room temperature. The mixture was heated to 50° C. Then 0.33 ml. (6.25 millimoles) of 50% aqueous sodium hydroxide solution was injected with a 1-ml. gas-tight hypodermic syringe. The molecular ratio of catalyst to 9,10-dihydroanthracene was 0.25. The system temperature was maintained at 50° C. ($\neq$3°C.) by means of the heater and a refrigerant coil wrapped about the apparatus. After catalyst injection, the start of oxygen uptake was preceded by an induction period, wherein the characteristic orange-red color developed, indicative of the presence of the carbanion. Because of an indefinite end point, a reaction half-time" was chosen as indicative of the reaction rate. It represents the time to achieve half the total oxygen pressure drop. At reaction completion, the reaction products were analyzed for anthraquinone, anthracene, and 9,10-dihydroanthracene, by a gas-chromatographic method. Example 12 was repeated as Examples 13–25, except that increasing quantities of carbazole up to 5% were also dissolved in the initial mixture. The weight percent carbazole added was based on the weight of 9,10-dihydroanthracene. The respective quantities of carbazole used and the results obtained are summarized in Table 2.

TABLE 2

| Example | Carbazole, wt. percent | Conversion, wt. percent | | Unconverted 9,10-dihydroanthracene, wt. percent | Induction period, min. | Reaction half-time, min. |
| --- | --- | --- | --- | --- | --- | --- |
| | | Anthraquinone | Anthracene | | | |
| 12 | 0.00 | 81.6 | 14.1 | 1.8 | 34 | 111 |
| 13 | 0.25 | 90.1 | 8.3 | 0.1 | 24 | 100 |
| 14 | 0.50 | 92.7 | 5.6 | 0.1 | 5 | 10 |
| 15 | 0.50 | 94.8 | 4.3 | 0.1 | 17 | 35 |
| 16 | 1.00 | 92.3 | 5.8 | 0.1 | 5 | 7 |
| 17 | 1.00 | 93.3 | 5.3 | 0.2 | 3 | 10 |
| 18 | 2.00 | 97.0 | 2.2 | 0.1 | 9 | 21 |
| 19 | 2.00 | 96.3 | 3.1 | 0.1 | 11 | 17 |
| 20 | 2.00 | 96.1 | 2.9 | 0.2 | 6 | 12 |
| 21 | 3.00 | 94.1 | 2.8 | 0.1 | 4 | 14 |
| 22 | 3.00 | 97.0 | 2.5 | 0.2 | 3 | 12 |
| 23 | 3.00 | 96.5 | 2.5 | 0.2 | 3 | 16 |
| 24 | 4.00 | 97.1 | 2.0 | 0.1 | 5 | 22 |
| 25 | 5.00 | 97.6 | 2.0 | 0.1 | 5 | 33 |

EXAMPLE 26

Example 12 was repeated, except that 0.06 grams of indole was added to the reaction mixture. This quantity is equimolar to 2% carbazole. The weight percent conversion was found to be 92.6% as anthraquinone and 5.6% as anthracene. About 0.2% 9,10-dihydroanthracene remained unreacted. The induction period was 8 minutes and the reaction half-time was 20 minutes.

The above Examples 12–25 illustrate that carbazole has a significant effect on the conversion to anthraquinone, anthracene and on the reaction rate as measured by reaction half-times and the induction period. In the single figure of the drawing two graphs are shown. The common abscissa is "Carbazole, Weight Percent." The one ordinate is "Anthraquinone Conversion, Weight Percent" used in drawing the solid-line curve. The other ordinate, shown for clarity on the right side, is "Anthracene Conversion, Weight Percent," used in drawing the dotted-line curve. In drawing the graphs, the results were averaged for the examples where the same quantity of carbazole was added.

Over the range from 0 to 1% carbazole, the percent conversion to anthraquinone increased rapidly from 81.6% to 92.8%, demonstrating a pronounced catalytic effect. At about 1% carbazole level, the trend began to level off. Beyond 2% to 5% the increase was slight.

Over the range from 0 to 1% carbazole, the percent conversion to anthracene decreased rapidly from 14.1% to 5.5%. At about 1% carbazole level, the trend began to level off. Beyond 2% to 5% the decrease was slight.

Were graphs drawn for the induction periods and reaction half-times, they would resemble the anthracene conversion graph. Another relationship that may be pointed out is the anthraquinone to anthracene ratio, calculated by dividing the number of moles of anthraquinone found in the final product by the number of moles of anthracene. This ratio appears to be a linear function of the carbazole concentration.

It is evident from the above examples that carbazole and indole are very effective cocatalysts even when the reaction mixture is maintained at a relatively low temperature. An economical continuous process may be conducted under these conditions since hydrolysis of the solvent to dimethylamine and sodium acetate would be at a minimum. This would then permit use of a minimum quantity of sodium hydroxide catalyst.

While the above examples illustrate preferred methods of operation, changes therein may be made without departing from the spirit of the invention. It will be apparent that for commercial operation, the hereinabove-described equipment may be made of any design known to effect the desired results.

Although we have disclosed herein the preferred practice of our invention, we intend to cover as well any change or modification therein which may be made without departing from the spirit and scope of the invention.

We claim:

1. A process for oxidizing 9,10-dihydroanthracene to anthraquinone comprising dissolving 9,10-dihydroanthracene in a dipolar aprotic solvent containing a catalyst chosen from sodium hydroxide, sodium methoxide, potassium hydroxide or potassium methoxide that forms a carbanion with said 9,10-dihydroanthracene, contacting the solution with an oxygen-containing gas and recovering precipitated anthraquinone.

2. A process as described in claim 1 characterized by said solvent being chosen from dimethylacetamide, dimethylformamide, acetonitrile or dimethyl sulfoxide.

3. A process as described in claim 1 characterized by the molecular ratio of said catalyst to 9,10-dihydroanthracene being between about 0.1 and 1.0.

4. A process as described in claim 1 characterized by adding said catalyst as a solution containing between about 0% and 75% by weight of a solvent chosen from water or methanol.

5. A process as described in claim 1 characterized by heating said solution initially to a temperature of at least about 30° C.

6. A process as described in claim 1 characterized by maintaining the temperature of said solution between about 40° C. and 80° C.

7. A process as described in claim 1 characterized by supplementing said catalyst with a cocatalyst chosen from carbazole or indole.

8. A process as described in claim 7 characterized by said cocatalyst being present in an amount of at least about 0.1% by weight of said 9,10-dihydroanthracene.

9. A process as described in claim 1 characterized by oxidizing a product of the step of hydrogenating catalytically a coal-tar fraction containing anthracene and carbazole to convert said anthracene to 9,10-dihydroanthracene.

10. A process as described in claim 9 characterized by oxidizing a 9,10-dihydroanthracene product resulting from the step of fractionally distilling the product of said hydrogenation step to concentrate said 9,10 - dihydroanthracene product.

11. A process as described in claim 10 characterized by adding carbazole in an amount between about 0.1% and 5.0% by weight of the 9,10-dihydroanthracene content.

References Cited

UNITED STATES PATENTS 3,163,657  12/1964  Morgan et al. ___ 260—369 XR

LORRAINE A. WEINBERGER, *Primary Examiner.*

H. WEGNER, *Assistant Examiner.*

U.S. Cl. X.R.

260—385